(12) United States Patent
Sinton et al.

(10) Patent No.: US 8,364,671 B1
(45) Date of Patent: Jan. 29, 2013

(54) METHOD AND DEVICE FOR RANKING VIDEO EMBEDS

(75) Inventors: Frank Sinton, Ormond Beach, FL (US); Paul Pattison, Ballwin, MO (US)

(73) Assignee: Mefeedia, Inc., Ormond Beach, FL (US)

( * ) Notice: Subject to any disclaimer, the term of this patent is extended or adjusted under 35 U.S.C. 154(b) by 136 days.

(21) Appl. No.: 12/710,287

(22) Filed: Feb. 22, 2010

Related U.S. Application Data

(60) Provisional application No. 61/154,729, filed on Feb. 23, 2009.

(51) Int. Cl.
*G06F 17/30* (2006.01)
(52) U.S. Cl. ............. 707/728; 725/44; 725/74; 725/86; 725/115
(58) Field of Classification Search .................. 707/728; 725/44, 74, 86, 115
See application file for complete search history.

(56) References Cited

U.S. PATENT DOCUMENTS

| | | | |
|---|---|---|---|
| 7,324,555 B1 * | 1/2008 | Chen et al. ..................... 370/468 |
| 7,933,338 B1 * | 4/2011 | Choudhry et al. ........ 375/240.26 |
| 2002/0038456 A1 * | 3/2002 | Hansen et al. ................... 725/46 |
| 2005/0060311 A1 | 3/2005 | Tong et al. |
| 2007/0244862 A1 | 10/2007 | Adams et al. |
| 2007/0250901 A1 * | 10/2007 | McIntire et al. .............. 725/146 |
| 2007/0266022 A1 | 11/2007 | Frumkin et al. |
| 2008/0133495 A1 | 6/2008 | Fischer |
| 2008/0154889 A1 * | 6/2008 | Pfeiffer ............................. 707/5 |
| 2008/0172615 A1 * | 7/2008 | Igelman et al. ............... 715/719 |
| 2008/0249798 A1 * | 10/2008 | Tulshibagwale .................. 705/1 |
| 2008/0320531 A1 * | 12/2008 | Kim et al. ........................ 725/87 |

* cited by examiner

*Primary Examiner* — Jean M Corrielus
(74) *Attorney, Agent, or Firm* — Haynes Beffel & Wolfeld LLP; Ernest J. Beffel, Jr.

(57) ABSTRACT

Technology described in this application relates to responding to queries for aggregated video and/or audio content that is found embedded in web pages. In particular, this technology relates to ranking of search results and compiling an index against which to search.

17 Claims, 4 Drawing Sheets

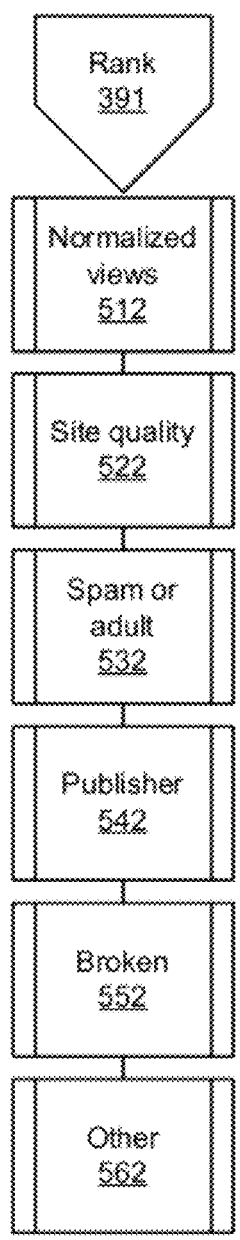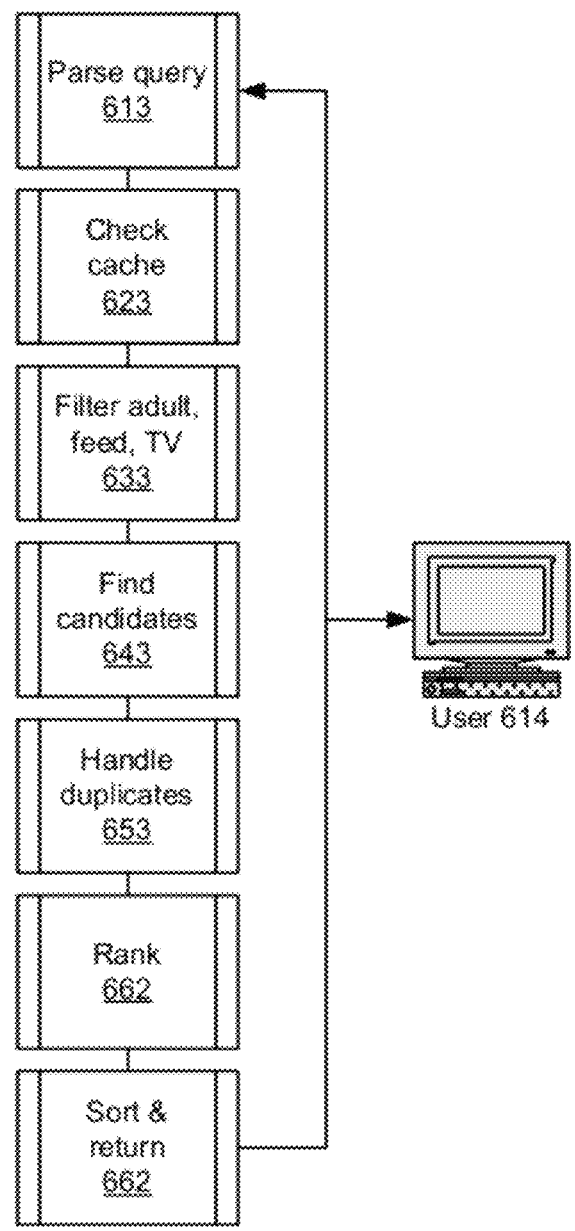
FIG. 5
FIG. 6

METHOD AND DEVICE FOR RANKING VIDEO EMBEDS

RELATED APPLICATION

This application claims the benefit of U.S. Provisional Application No. 61/154,729, filed 23 Feb. 2009, which is hereby incorporated by reference.

BACKGROUND OF THE INVENTION

Technology described in this application relates to responding to queries for aggregated video and/or audio content that is found embedded in web pages. In particular, this technology relates to ranking of search results in response to text-based queries and compiling an index against which to search. Particular aspects of the technology are described in the drawings, specification and claims submitted herewith.

The amount of media available on the web is staggering and growing rapidly. Indexing content on the web is enormously challenging. Full courses are taught in major universities regarding search engines.

Retrieving video content presents new and different challenges for search engines. Some researchers have attempted to develop graphical search by example interfaces based on analysis of images and videos. While this may be promising for enforcement activities by the movie industry and TV studios or for face recognition in surveillance videos, it would not be practical to search a video hosting website such as YouTube using sketch-based queries. Most users expect to search for video using text searches.

Using text searches to find video content is much more challenging than using text searches to find documents. The content sought is of a different type than the metadata searched. Much video content, such as videos found on YouTube, is supplied by amateurs, without quality control of associated textual metadata.

While the corpus of videos and podcasts it is relatively modest, as a part of the whole Web content, it is expanding quickly. From 2004 through June, 2008, the assignee of this application expanded its indexing from 50,000 videos and podcasts to over 10 million items. In 2009 and 2010, this grew to 30 million and 50 million items.

With the explosion of video content, a new category of enterprise has emerged, sometimes called video aggregators and other times called video search engines. The video aggregators identified in the media include MeFeedia, Blinkx, VideoSurf, Pixsy, Yidio, CastTV and Veveo. These companies index videos across video content hosts and sites that embed links to the videos.

Accordingly, an opportunity arises to provide superior and improved search tools and indexes. In the sections that follow, we describe a ranking tool adapted specifically to video and/or audio content hosted on sites such as YouTube and NBC and distributed both through the hosted sites and RSS feeds.

SUMMARY OF THE INVENTION

Technology described in this application relates to responding to queries for aggregated video and/or audio content that is found embedded in web pages. In particular, this technology relates to ranking of search results and compiling an index against which to search. Particular aspects of the technology are described in the drawings, specification and claims submitted herewith.

BRIEF DESCRIPTION OF THE DRAWINGS

FIG. 5 depicts steps that can be combined to rank a video object and/or its video object embed.

FIG. 6 depicts one sequence of events leading to a query response.

DETAILED DESCRIPTION

Video and audio objects are large compared to the HTML code for webpage. This leads developers to embed references to video and audio content, rather than putting the content directly on a webpage.

In the following description, we will focus on video, for simplicity. Most of the media content processed using the following technology has been video content. Roughly two-thirds of the video objects have been in Flash format, and the rest is spread among a dozen different mime types, mostly .mp3 or Quicktime mov format. Videos are associated with related videos that are captured by examining source location and additional metadata around the entry. Sometimes, certain videos identified by an editorial staff are designated as "video worth watching." These videos may prominently displayed site wide in addition to the right hand column next to videos, with a corresponding increase in views. One of skill in the art will understand that much of what we say about video can be applied to audio and podcasts as well.

An embedded video object characteristically is identified by an HTML "object" or "embed" tag, which provides a link for loading the content. We sometimes refer to this as a video object embed. Standard dimensions have emerged for the display size of the typical video object embeds.

Embedded video objects often come from a common source, as a practice has emerged of accompanying hosted video with a link that can be embedded by others. The availability of embedded links eliminates much, but not all duplication, as some website designers prefer to ensure the availability of video objects by maintaining their own copy of the objects. The objects may be reproduced as exact copies, including large parts of the object name, or they may be edited to suit.

Figure 1A:
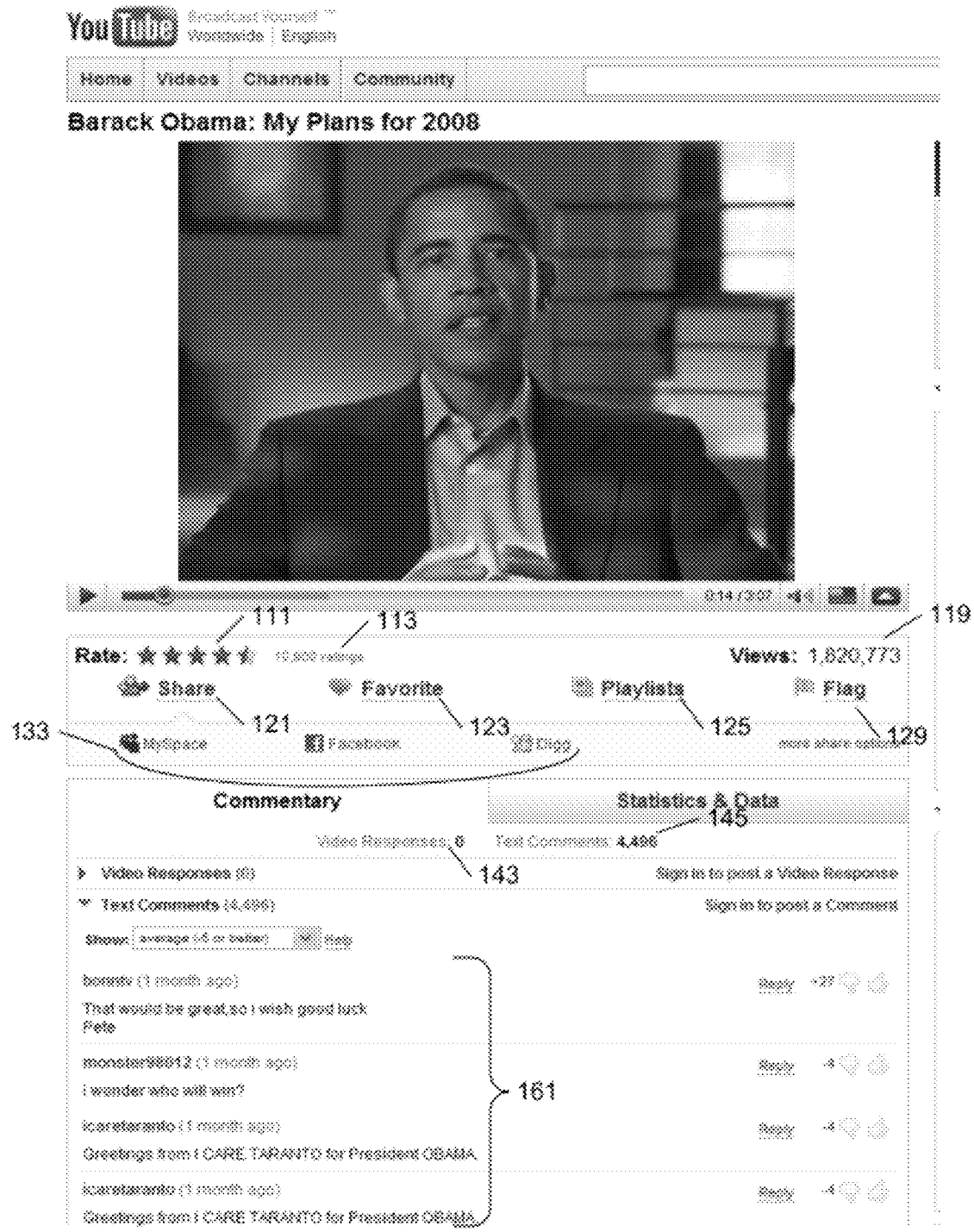
FIGS. 1a-b reproduce a YouTube posting by now-President Barack Obama, which indicated 1,820,773 views 119 of the video.
Figure 1B:

These inventors have noted a significant difference between hosted content, such as embedded videos, and linking to traditional web pages. The video hosts typically provide statistics on views or hits of individual video objects. FIGS. 1a-b reproduce a YouTube posting by now-President Barack Obama, which indicated 1,820,773 views 119 of the video. Similar data can be found on other video hosting sites such as DailyMotion and Metacafe.

In the absence of statistics provided by content hosts, traditional search engines typically rely on statistics measured from visits to their own portal or search engine. For instance, website hosts often install widgets from Google Analytics™ to keep track of navigation among pages on their website. This provides useful, if somewhat flawed data regarding traffic on a particular website, but is limited to that website. Large portals collect a significant amount of data and advertising networks may have an even wider reach, across subscribing websites that the advertising networks do not control.

With embedded video objects, the interesting statistic is how often the embedded object has been requested from the host. Fortunately, most video hosts are providing statistics that video aggregators can collect by scraping the host websites.

The availability, location and labeling of usage statistics varies among hosts. There are some general patterns and templates can be established for extracting popularity data from pages on the host sites. These templates can be semi-customized for each significant hosting site. Tools can be used to map particular statistical elements to objects on a webpage and automatically generate scrapers adapted to the particular page structure.

Popularity statistics include more than just views 119. The sample pages in FIGS. 1*a-b* from YouTube also include ratings of the video. The ratings are expressed with an aggregate score (four and one-half stars for President Obama) 111 and with a number of ratings 113. User response options are provided for the user to share 121, favorite 123, add to playlists 135 or flag 129 a particular video. On some websites, these actions are counted. For the accompanying Obama example, the favorited statistic is 1,420 times 187. The linked to statistic 191 lists five sites that link to the video and the number of views generated from each of those sites. Similarly, statistics might be available from hosts for the number of playlists to which the video was added and the number of times that hosting site members flagged the video. On YouTube, in particular, statistics also are available for honors given 181 to a video and responses posted. The posting date 171 also is given.

Video hosting websites share with blogs an opportunity for users to leave comments 161 and make video responses 143. A scraping and analysis tool can make use of comments to score the popularity of the video. The number of comments 145 may be neutral or indeterminate of whether the video was badly or well received. However, the vocabulary used in the comments 161 will be telling. In addition to vocabulary, the quality of the comments can be judged by applying measures of sentence complexity and good grammar. Either the number of words or the sentence complexity in a comment may correspond roughly to the thoughtfulness of the comment. The system may apply measures of sentence complexity such as Flesch Reading Ease or Flesch-Kinkade Grade Level. Grammatical nonsense may be detected as a matter of spam detection. Robot-generated nonsense can be eliminated from consideration by a combination of making sure the that the words in the comments are also found in a dictionary and/or applying grammatical analysis to make sure that sentences include a subject and verb. Again, the reading grade level of a reasonably well constructed sentence can readily be calculated and used in evaluation of a particular comment.

These inventors believe that automated evaluation of the content of comments on videos has not previously been used when ranking search results responsive to a video query.

Figure 2:
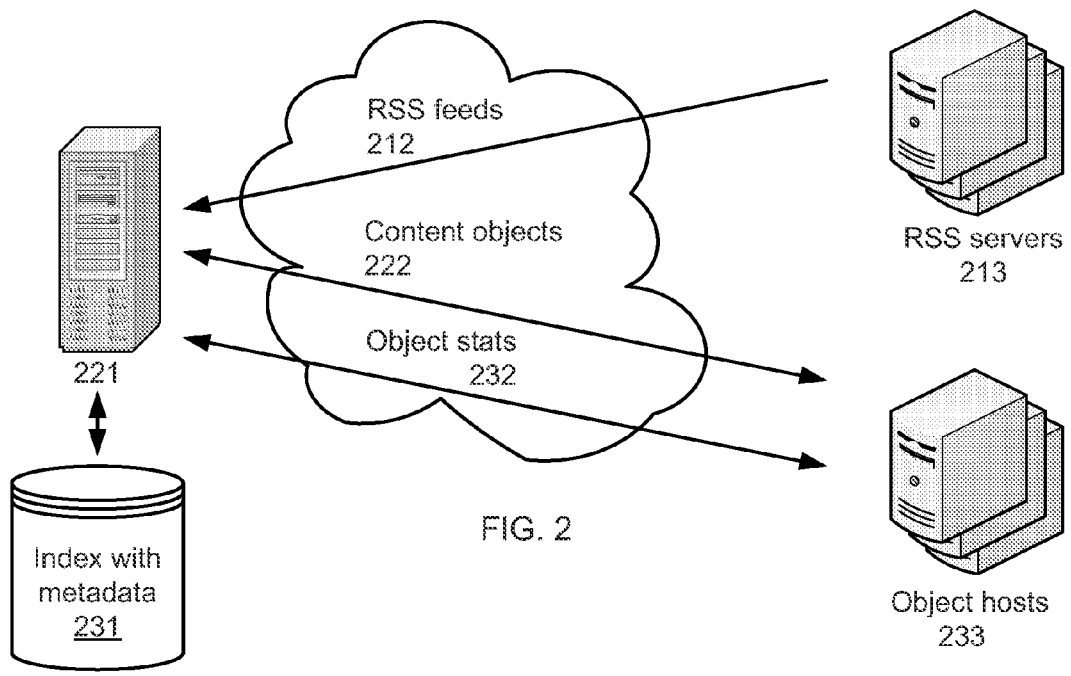
FIG. 2 depicts collection of video objects and popularity statistics from RSS feeds and video hosting websites.

FIG. 2 depicts collection of video objects and popularity statistics from RSS feeds and video hosting websites. Originally, only RSS feeds were used. As of June 2008, roughly 38 k RSS feeds had been submitted. Of course, in the future, the sources of video object embeds may be expanded again.

A server 221 handles collection and processing. Reference here to a server includes a group of servers, a server cluster, multiple server instantiations running on a virtual server host, workstations and other varieties of computing resources used to receive and process RSS feeds and to query video host servers. The server 221 builds an index of video embeds. It includes in the index or in indexed entries metadata regarding the video object embeds. Typically, the server 221 is registered to receive RSS feeds 212 from RSS servers 213. In practice, MeFeedia has processed tens of thousands of RSS feeds 212 on an ongoing basis. In some cases, the RSS feed providers have registered for indexing by MeFeedia. In other instances, MeFeedia's staff has selected RSS feeds to watch. The server 221 periodically retrieves video object embeds or, more generally, hosted content objects 222 from video hosting servers 233. The server 221 also queries for object statistics 232 or otherwise obtains object statistics 232 from the object hosts 233.

The RSS crawling can be done by a single crawler that examines all tens of thousands of feeds at least once a day for new content. The feed spider then compresses and stores the video documents and metadata into a repository. Video objects can be given ID numbers, such as Global Id's assigned whenever a new URL or video object embed is parsed out of an RSS feed. An indexer performs a number of functions. It reads the repository, checks for duplicates, and parses them. Each document can be organized with other videos into a classification structure designated by the feed source.

In addition to the feed spider, an automated web crawler can be used selectively to crawl popular video sites only for content and useful metadata around video objects. This crawler can utilize a URL server that sends lists of URLs or pages for hosted video objects to be fetched to the crawlers. The web pages that are fetched are then sent to the indexer. The web crawler indexer performs another important function. It parses out all the links in every web page and stores important information about them in an anchors file. This file contains enough information to determine where each link points from and to, and the text of the link. Often the information retrieved through this method provides more data than is provided in the media RSS spec. Experience has shown that a well-maintained crawler can find about 350,000 videos a day, and crawl 50,000 to 100,000 RSS feeds a day.

In some implementations, carefully designed data structures are used to reduce the cost of crawling, indexing, and searching a large collection. A repository contains the HTML metadata of video entry pages. In the repository, documents are stored one after the other and are prefixed by docID, length, and URL. Optionally, availability of thumbnails can be assured and broken image links prevented by caching representative images of the videos. Amazon's S3 simple file storage can be addressed via a subdomain for image storage.

A document index keeps information about each document. In one implementation, it uses a fixed width ISAM (Index sequential access mode) index, ordered by Global Id. The information stored in an index entry includes the current document status, a pointer into the repository, any document flags, and various statistics. If the indexed object has been flagged, the index entry also contains a pointer into a classification structure such as music, commercially produced episodic content, or news. This design provides a reasonably compact data structure and the ability to segregate quality content during a search. The lexicon has several different forms. It is useful for the lexicon can fit in memory for a reasonable price. As the cost of memory drops, relatively large lexicons fit in memory. A hit list corresponds to a list of occurrences of a particular word in a particular document including position, font, and capitalization information. Hit lists account for most of the space used in both the forward and the inverted indices. There are two types of hits: fancy hits and plain hits. Fancy hits include hits occurring in a URL, title, anchor text, or meta tag. Plain hits include everything else.

Figure 3:
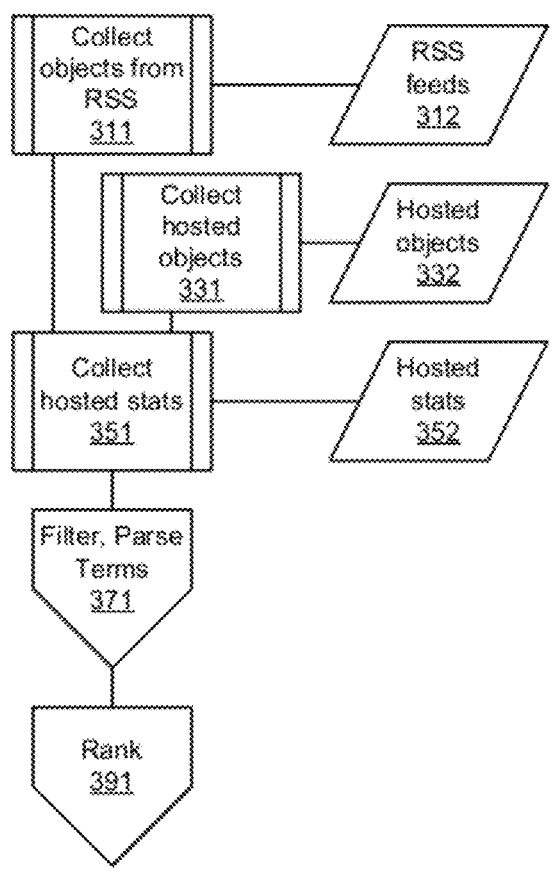
FIG. 3 is a high level flow chart of content collection.

FIG. 3 is a high level flow chart of the collection depicted in FIG. 2. The server collects objects embeds 311 from the RSS feeds 312. This may include collecting the embed tags or codes that link the web page to the video objects at their host. It may include collecting reference images that a user views to decide whether to select a particular video. Optionally, it could include copying the object to which the video object embed points, but that would be an inefficient use of storage and would have both copyright and bandwidth implications. The server collects object embeds 331 from object hosts 332. The object embeds can most efficiently be collected from pages that show multiple selection options, such as the most popular videos of the day. For topics of current interest, the video host sites can be queried for the most relevant videos. The server also collects popularity statistics 341 from the web pages for individual hosted video objects 342.

One of the server's tasks is to filter and parse 371 the video objects and to extract terms that can be used to index particular object embeds. This is described more fully below, in the context of FIG. 4.

Another server task is to rank video objects 391. The ranking can be done for objects alone, indicating their popularity, or responsiveness of objects to search terms and combinations of search terms, as more fully described below in the context of FIG. 5. The ranking can be done preliminarily and stored with the index or it can be done at least partially in response to a multi-word set of query terms, either to be cached or in response to a particular query.

Figure 4:
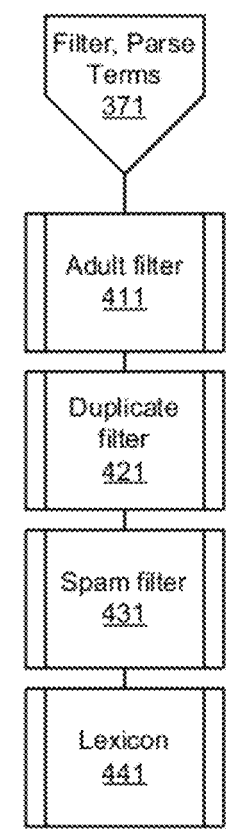
FIG. 4 depicts steps that can be combined to filter a video object and/or its video object embed.

FIG. 4 depicts steps that can be combined to filter a video object and/or its video object embed. The filters applied can include an adult content filter 411, a duplicate filter 421, a spam filter 431 and a Lexicon filter 441.

FIG. 5 depicts steps that can be combined to rank a video object and/or its video object embed. The system maintains much more information about video documents than typical search engines. Hit lists may include date, title, description, source, and tag information. Additionally, metadata such as runtime length, mime type, filesize, approximate view count data are available to compute the ranking score of the document. Velocity statistics may also be available, computed from repeated retrieval of counts from host web sites.

In FIG. 5, factors that enter into the illustrative ranking process include normalized views 512, a metric of the site quality 522, which give professionally produced video content from sites such as NBC Sports a higher factor, filtering for spam or adult content 532, a metric of publisher quality 542, which gives certain authors of hosted content a higher factor based on their historical popularity, the probability of a broken link 552 which will frustrate a searcher who clicks through to access the embedded video object, and other factors 562.

Many options for combining this information into a rank score produce subtly different results. In one embodiment, the ranking function avoids giving any particular factor can have too much influence. In some implementations, a very low score on any particular factor can result in a very low ranking score; for instance, using a multiplicative combination of factors. In other implementations, an additive combination of factors eliminate the veto effect of any particular factor. In a special debug mode, the system display the numbers and matrices with the search results. These displays are useful in developing a ranking score formula and calculation. Responding to a query can include processing Boolean operators, negation, and stemming.

A number of factors are mentioned in accompanying documents that can be used in place of or in addition to the normalized number of views in this equation. The popularity statistics for video are much different from standard web page popularity measures, because embedded video objects take on a life of their own.

In addition to popularity measures further described in accompanying materials, qualitative measures can be used to dampen gross, raw popularity numbers. Some of the qualitative measures are expressed in the following formula. It is not necessary for all of the factors in this formula to be combined and, of course, additional factors can be used. The multiplicative form of this equation can be modified to an additive form or hybrid multiplicative and additive.

$$R = \frac{Views}{Views_{Median}} \times (1 - P_{Broken}) \times D_{Site} \times D_{Spam} \times D_{UserPopularity}$$

Where:
R=Rank in the range of (0.00-1.00)
Views=Asset views as reported by publish site.
Median Views=Average views of all videos discovered on publish site.
Broken Probability=Probability this video may be unavailable based on date, views, user, and average site unavailability.
Site Dampening=(0.00-1.00) Quality of publish site. Stats such as buffer time have affect, language, number of videos.
Spam Dampening=(0.00-1.00) Probability that the asset may be spam or adult content.
UserPopularty Dampening=(0.00-1.00) Dampening function that relates to the user who published the video. User tracking, average view count among other factors have an affect.

User and user friend/buddy information also can be used in the ranking. In one embodiment, the system uses JavaScript and server side monitoring used to collect data. The script bouncetracker.js has been used to keep track of time on a page. This script uses the on Unload event intrinsic to JavaScript is used to report the elapsed time on the page. The on Unload approach is more effective for time on a page than code that Google Analytics has used, because Google's code missed the departure from last page of a site, so time spent on the last page typically was not counted by Google Analytics.

A wide range of server side and client side technologies are available for tracking user preferences. These technologies are generally described in patent applications initially assigned to Claria or Jellycloud and in references cited during the prosecution of those cases.

Applying friend/buddy information to rating is a matter of combining linking the friends or buddies to a user and applying the user preferences technology to the friends. This is computationally challenging.

The indexes built as described above and the ranking are useful for responding to queries. FIG. 6 illustrates one sequence of events leading to a query response.

1. Parse the query 613.
2. Identify if a cached result exists within 12 hours 623. If so, serve results.
3. Reference lexicon for possible adult search or specific feed or tv show reference 633. Special handling may be involved when a query seeks adult content, content from a specific feed such as NBC Sports, or a particular TV show such as American Idol.
4. Scan through the doclists 643 until there is a document that matches all the search terms. This may involve doclists of an inverted index organized by terms. The terms may include short phrases.

5. Compute the ranking score 664 of that document for the query. Given the ranking factors described above, some of the factor components could be precomputed. An advantage of not precomputing and merely maintaining 6. If we are not at the end of any doclist go to step 4. To put a limit on response time, once a certain number (for instance, 1000, 5000 or 10,000) of matching documents are found, the searcher can stop looking for more documents. When this shortcut is used, it may be useful to order the index entries so that more popular video objects are processed first or so that most recently posted video objects are processed first.

7. Group duplicate content 653 and identify potential keyword spam or adult content. Alternatively, duplicate content can be identified in the corpus of video objects, for instance with a pointer from a first duplicate instance of a video object embed to a list of web pages that include duplicate embedded objects. Duplicate embedded objects can be identified as exact duplicates with the same host or more broadly as substantially similar video content with multiple hosts. For instance, different formats of the same video could be considered duplicates.

8. Sort the documents that have matched by their ranking score and return 662 the top 20, 50, 100 or other desired number of documents.

In one commercial application, most of the backend, including the search product, was written in PHP4/5 with a MySQL 4. The html was rendered using a templating engine to separate the presentation logic.

Many of the tables have been partitioned for faster selects. There is one master DB and one slave DB. Most reads are spread across these resources. Each web page is its own file. A common library of shared modules can be reused in the generation of various pages. This agile design makes it very easy to implement standalone or site wide changes. Most of the pages are cached using a simple file caching system with smart cache invalidation. Within a 24 hour window, at least 350,000 unique pages have been served from cache. ModRewrite is used throughout the site to make more Search Engine Optimized "friendly" urls.

Software components used in this technology or its development have included RedHat Enteprise 4 and 5, PHP 4 & 5, Apache 2 with mod_PHP, MySQL 4 community release, Subversion, PHP Libraries: GD, freetag, SimplePie, reCaptcha, JW Flash player, Squid Server, Amazon S3 (for image caching), EC2 (SVN & Trac), and FFMPEG.

SOME PARTICULAR EMBODIMENTS

The present invention may be practiced as a method or device adapted to practice the method.

One method embodiment is useful for preparing to deliver relevant video content responsive to search queries seeking video content. This method includes collecting embedded video objects from RSS feeds and video hosting websites and identifying duplicates. It further includes collecting popularity statistics for at least some of the video objects from a plurality of the video hosting websites, wherein the popularity statistics include at least a number of views. The semi-custom scrapers described above are useful for compiling statistics. Alternatively, an XML feed of data or other data transfer could be arranged with cooperating video hosting websites. And, reference to video or video hosting can be extended to audio and audio hosting.

This method also includes parsing tags used to embed the video objects and text associated with the video objects in the RSS feeds and on the video hosting websites and producing, from the parsing, a plurality of terms associated with the video objects. Optionally, it includes indexing on a machine-readable storage medium the video objects for retrieval responsive to queries using the terms. The ranking of the video objects, for ordering responsive to a query, is based on a combination of factors. The factors include at least a normalized number of views of a particular video object at particular video hosting websites based on the number of views at the particular video hosting websites, thereby normalizing viewing frequency of the particular video object among sets of video objects available from the particular video hosting websites. Among the factors, expected quality metrics, include some or all of quality experience with a source of the video object, quality experience with the video hosting website where the video object resides, if different from the source, and a likelihood that a link to the video object is not broken.

This method can be extended in many ways, including adding a variety of factors to the ranking combination. One options is to further include collecting from the video hosting websites at least some comments on the video object attributed to viewers and including in the ranking combination a popularity statistic based on analysis of comments on the video object. There are several options for the analysis of comments. Lexical analysis of the comments may exclude machine generated comments. Parsing the comments may yield additional terms to add to the indexing. Vocabulary analysis of the comments can support evaluation the postiveness or negativeness of the comments. Grammatical analysis of the comments to evaluate the complexity of the comments can be used to assign more and less weight to individual comments or the comments to a particular video object.

A shortcoming in the statistical reporting by hosting sites can be overcome by collecting instances of the popularity statistics from the video hosting websites on multiple occasions for a particular video object. From multiple statistics, one can calculate one or more popularity velocity statistics based on at least two of the instances and time between collecting the instances. Optionally, this can be extended to calculating popularity acceleration statistics from two or more velocity statistics, as a measure of growing or diminishing popularity. In turn, the ranking combination can include the popularity velocity and/or acceleration statistics.

Another useful factor in the ranking combination may be viewer ratings of the video object, collected from the video hosting sites. Ranking of the video objects may include in the ranking combination a popularity statistic based on the viewer ratings of the video object.

Other useful factor in the ranking combination may be include counts of sharing the video object, counts of favoriting the video object, counts of adding the video object to a playlist, counts of adding the video object to a playlist, counts of embedding the video object on a number of different websites, counts of flagging the video object, and counts of sharing the video object. These counts and velocity/acceleration statistics can be collected from hosting web sites and included in the ranking combination.

Optionally, duplicates can be handled by accumulating statistics from multiple sources and aggregating them for the underlying video object to produce a global score for a video object. Both global scores and URL specific scores can be maintained for particular video objects that have duplicated video object embeds. The URL specific scores can be helpful in selecting among duplicates to deliver responsive to a query or in ordering duplicates if a query is extended by a viewer to requesting identification of duplicates.

A further aspect of ranking of the video objects may include expressing the normalized views and the expected quality metrics as factors on a fixed scale and combining the factors so that a very low score on any of the factors results in a very low score of the combined factors. In one implementation, this can be accomplished by scaling the factors from about 0 to n>0 and multiplying some or all of the factors together. Equivalently, the factors may be expressed logarithmically on a scale equivalent to from slightly more than 0 to n>0 or to n<1 and added together. Mathematically, the margin above zero can be chosen to avoid underflow of the logarithmic number.

Some formulas may be applied to ranking of the video objects. The normalized number of views and the expected quality metrics may be combined applying the formula $$R = \frac{Views}{MedianViews} \times (1 - PBroken) \times DSource \times DHost$$

wherein R is a ranking score
Views/Median Views is the normalized number of views
PBroken is an estimated probability that a link to the embedded video object is broken
DSource is the quality experience with the source
DHost is the quality experience with the video hosting website
DComments is the popularity statistic based on the analysis of the comments.

The variables Views/Median Views, PBroken, and DSource can be expressed in range(s) k(0.0 to 1.0) or a logarithmic equivalent, where k is a scaling factor or vector.

The formula above can be extended by adding one or more of the following factors or their velocity or acceleration derivatives to the multiplicative form:

DComments: a popularity statistic based on the analysis of the comments.

DUserRating: a viewer ratings statistic.

DSharing: a popularity statistic based on the counts of sharing.

Any of the methods described above or implementations, embodiments or aspects of the methods may be embodied in a device using a computer to rank video objects responsive to a query for video content. They also may be embodied in a device using a computer to prepare video objects for ordering in response to a query for video content. A system that prepares video objects for ordering in response to a query may include modules that collect video object embeds.

The technology described may be characterized from the perspective of the video aggregator and/or video search engine, or a service that rebrands search results delivered by the video aggregator. From the rebranding perspective, the technology described includes receiving a query, calling on a video search engine that practices the methods described, and responding to a query with results obtained from the video search engine.

A device embodiment, from the video search engine perspective, may be embodied in a device including a processor, memory coupled to the processor, one or more ports coupled to the processor (or the memory) adapted to rank video objects responsive to a query for video content, to prepare video objects for ordering in response to a query, or to collect video object embeds.

While the present invention is disclosed by reference to the preferred embodiments and examples detailed above, it is understood that these examples are intended in an illustrative rather than in a limiting sense. Computer-assisted processing is implicated in the described embodiments. Accordingly, the technology disclosed may be embodied in methods for rank video objects responsive to a query for video content, to prepare video objects for ordering in response to a query, or to collect video object embeds.

The technology disclosed may be embodied in systems including logic and resources to rank video objects responsive to a query for video content, to prepare video objects for ordering in response to a query, or to collect video object embeds.

The technology disclosed may be embodied in systems that take advantage of computer-assisted ranking of video objects responsive to a query for video content, preparation of video objects for ordering in response to a query, or collection of video object embeds.

The technology disclosed may be embodied in a computer readable storage medium with logic to carry out ranking of video objects responsive to a query for video content, preparation of video objects for ordering in response to a query, or collection of video object embeds.

The technology disclosed may be embodied in computer a readable transport medium or data streams impressed with logic to carry out ranking of video objects responsive to a query for video content, preparation of video objects for ordering in response to a query, or collection of video object embeds.

The technology disclosed may be embodied in computer-accessible services that carry out computer-assisted ranking of video objects responsive to a query for video content, preparation of video objects for ordering in response to a query, or collection of video object embeds. It is contemplated that modifications and combinations will readily occur to those skilled in the art, which modifications and combinations will be within the spirit of the invention and the scope of the following claims.

We claim as follows:

1. A method of preparing to deliver relevant video content responsive to search queries seeking video content, including:

collecting embedded video objects from RSS feeds and video hosting websites;

identifying duplicate content among the embedded video objects;

collecting and aggregating popularity statistics for at least some of the duplicate video objects from a plurality of the video hosting websites, wherein the popularity statistics include at least number of views;

parsing tags used to embed the video objects and text associated with the video objects in the RSS feeds and on the video hosting websites and producing, from the parsing, a plurality of terms associated with the video objects;

indexing on a machine readable storage medium the video objects for retrieval responsive to queries using the terms; and ranking the video objects based on a combination of at least
a normalized number of views of a particular video object at particular video hosting websites based on the number of views at the particular video hosting websites, and
expected quality metrics, including
quality experience with a source of the video object,
quality experience with the video hosting website where the video object resides, if different from the source, and
a likelihood that a link to the video object is not broken;

combining the normalized number of views and the expected quality metrics as:

$$R = \frac{Views}{MedianViews} \times (1 - PBroken) \times DSource \times DHost$$

wherein R is a ranking score,
Views/MedianViews is the normalized number of views,
PBroken is an estimated probability that a link to the embedded video object is broken,
DSource is the quality experience with the source, and
DHost is the quality experience with the video hosting website.

2. The method of claim 1, further including:
collecting from the video hosting websites at least some comments on the video object attributed to viewers; and
including in the ranking combination a popularity statistic based on analysis of comments on the video object.

3. The method of claim 2, further including in the analysis of the comments lexical analysis of the comments to exclude machine generated comments.

4. The method of claim 2, further including in the analysis of the comments parsing the comments to find the terms to add to the indexing.

5. The method of claim 2, further including in the analysis of the comments parsing the comments to evaluate the postiveness or negativeness of the comments.

6. The method of claim 2, further including in the analysis of the comments grammatical analysis of the comments to evaluate the complexity of the comments.

7. The method of claim 2, further including:
collecting from the video hosting websites counts of sharing the video object; and
including in the ranking combination a popularity statistic based on the counts of sharing the video object.

8. The method of claim 2, further including combining the normalized number of views and the expected quality metrics as:

$$R = \frac{Views}{MedianViews} \times (1 - PBroken) \times DSource \times DHost \times DComments$$

wherein R is a ranking score
Views/MedianViews is the normalized number of views
PBroken is an estimated probability that a link to the embedded video object is broken
DSource is the quality experience with the source
DHost is the quality experience with the video hosting website
DComments is the popularity statistic based on the analysis of the comments.

9. The method of claim 1, further including:
repeatedly collecting instances of the popularity statistics from the video hosting websites for a particular video object;
calculating one or more popularity velocity statistics based on at least two of the instances and time between collecting the instances; and
including in the ranking combination the popularity velocity statistics.

10. The method of claim 9, further including combining the normalized number of views and the expected quality metrics as:

$$R = \frac{Views}{MedianViews} \times (1 - PBroken) \times DSource \times DHost \times DUserRating$$

wherein R is a ranking score
Views/MedianViews is the normalized number of views
PBroken is an estimated probability that a link to the embedded video object is broken
DSource is the quality experience with the source
DHost is the quality experience with the video hosting website
DUserRating is the viewer ratings.

11. The method of claim 1, further including:
collecting from the video hosting websites viewer ratings of the video object; and
including in the ranking combination a popularity statistic based on the viewer ratings of the video object.

12. The method of claim 11, further including combining the normalized number of views and the expected quality metrics as:

$$R = \frac{Views}{MedianViews} \times (1 - PBroken) \times DSource \times DHost \times DSharing$$

wherein R is a ranking score
Views/MedianViews is the normalized number of views
PBroken is an estimated probability that a link to the embedded video object is broken
DSource is the quality experience with the source
DHost is the quality experience with the video hosting website
DSharing is the popularity statistic based on the counts of sharing.

13. The method of claim 1, further including:
collecting from the video hosting websites counts of sharing the video object; and
including in the ranking combination a popularity statistic based on the counts of sharing the video object.

14. The method of claim 1, further including:
collecting from the video hosting websites counts of favoriting the video object; and
including in the ranking combination a popularity statistic based on the counts of favoriting the video object.

15. The method of claim 1, further including:
collecting from the video hosting websites counts of adding the video object to a playlist; and
including in the ranking combination a popularity statistic based on the counts of adding the video object to a playlist.

16. The method of claim 1, further including:
collecting from the video hosting websites counts of flagging the video object; and
including in the ranking combination a popularity statistic based on the counts of flagging the video object.

17. The method of claim 1, wherein Views/MedianViews, PBroken, and DSource are expressed in range(s) k(0.0 to 1.0) or a logarithmic equivalent, where k is a scaling factor or vector.

* * * * *